United States Patent Office 3,326,804
Patented June 20, 1967

3,326,804
OLEAGINOUS COMPOSITIONS CONTAINING SLUDGE DISPERSANTS
Shih-en Hu, Roselle, N.J., assignor to Esso Research and Engineering Company, a corporation of Delaware
No Drawing. Filed Oct. 1, 1965, Ser. No. 492,267
14 Claims. (Cl. 252—34)

The present invention relates to novel additives which improve the sludge dispersant properties of oleaginous compositions and to the preparation of such additives. Broadly, the novel additives are nitrogen-containing graft polymers prepared by grafting monomers containing at least one vinylidene group and at least one carboxyl group onto hydroperoxidized copolymers of ethylene and at least one other alpha olefinic monomer. The major portion of the oleaginous compositions comprise gasoline, middle distillate fuel, or lubricating oil.

Lubricants for modern, high compression, piston-type internal combustion engines necessarily have high detergency properties, i.e., they must have an efficient sludge dispersant action and high resistance, in order to free the engines from deposits of varnish, sludge, and coke-like materials. Generally, a heavy duty detergent type lubricating oil is employed in such engines in order to maintain the desired high degree of engine cleanliness and thereby promote longer engine life. Detergent properties in fuel oils, jet fuels, gasolines, and heating oils are also desirable in order to minimize carbonaceous deposits in lines, pumps, filters and the like.

In the past, the majority of detergent sludge dispersants and antioxidant materials which have been developed for use in these types of oleaginous compositions, particularly those employed as fuels or lubes for internal combustion engines, have been metallic derivatives such as alkaline earth metal sulfonates, alkaline earth metal salts of alkenol sulfides, colloidal dispersons of metallic carbonates such as alkaline earth metal carbonates, and the like. While these additives have generally been highly satisfactory as sludge dispersants and detergents, in many instances the presence of inorganic compounds disadvantageously gave rise to ash contents in the additives. The ash tends to accumulate in the combustion chambers of the engine and cause preignition, spark plug fouling, valve burning and similar undesirable conditions. For this reason, much attention has been devoted to producing an effective dispersant which is ash free and thus essentially eliminates the cause of preignition, spark plug fouling, valve burning, and the like.

In accordance with the present invention, an effective oil-soluble, ash-free, detergent type inhibitor and dispersant can be prepared by first preparing a hydroperoxidized copolymer of ethylene and another alpha olefinic monomer. This material is grafted with a monomeric compound which contains at least one vinylidene group and at least one carboxyl group. The carboxyl-containing grafted polymer is then further reacted with a polyalkylene polyamine in order to form either the amine acid addition salt of the amine with the carboxylic acid derivative or an amide between the amine and the carboxylic acid derivative or a mixture of both types of compounds. As will be hereinafter more fully described, a number of methods can be employed for finally producing the carboxylic acid containing grafted copolymer. When referring to monomers containing at least one "carboxyl group," the instant invention contemplates any monomer containing a polar group which is convertible into a carboxylic acid group in addition to at least one vinylidene group.

The present invention employs a copolymer of ethylene and at least one alpha monoolefin having the structure $R-CH=CH_2$ where R is an alkyl radical, preferably not having more than eight carbon atoms.

Representative examples of the preferred alpha olefin having the structure $R-CH=CH_2$ wherein R is a C to $C_8$ alkyl radical include: propylene; 1-butene; 4-methyl-1-pentene; 1-pentene; 1-hexene; 1-heptene; 1-octene; 1-nonene; 1-decene; 5-methyl-1-nonene; 5,5-dimethyl-1-octene; 4-methyl-1-hexene; 4,4-dimethyl-1-pentene; 5-methyl-1-hexene; 4 - methyl - 1 - heptene; 5 - methyl - 1 - heptene; 6 - methyl - 1 - heptene; 4,4 - dimethyl - 1 - hexene; and 5,6,6-trimethyl-1-heptene.

Conventionally, these copolymers are prepared using Freidel-Crafts type catalysts or using the Ziegler type catalysts. These reactions are well known and are conventionally employed. Accordingly, the present invention is not predicated upon the particular catalyst system employed in preparing the copolymer starting materials.

The ethylene monomer unit concentration in the copolymers of the present invention ranges in general from about 20% to about 75% by weight. Copolymers having more ethylene monomer units tend to be stiff and non-elastomeric. The concentration of the above described alpha monoolefin monomer units ranges in general from about 25% to about 80% by weight. Copolymers having a higher alpha monoolefin content tend to be stiff and boardy.

Preferably the ethylene-propylene copolymers have viscosity average molecular weights ranging between 100,000 and 500,000. These tend to be amorphous and rubber-like materials and have been found to be entirely satisfactory starting materials in preparing the novel additives hereinafter described. A suitable specific catalyst of the Ziegler type involves the use of vanadium oxychloride complexed with diethyl aluminum chloride.

Additionally, terpolymers may be employed for producing the novel dispersant type additives herein contemplated. The same alpha monoolefins described above are employed but in addition small percentages, i.e., up to 4 or 5% of a third unsaturated monomer, viz a nonconjugated diolefin, is employed. This too is a conventional process which is commercial and forms no part of the invention so far as the production of the terpolymers is concerned. The third monomer is preferably methylene norbornene but may also be cyclopentadiene, 2-methylnorbornadiene, a nonconjugated hexadiene, 2,4-dimethyl-2,7-octadiene, etc. The terpolymers and preparations thereof are amply described in U.S. Patents 3,000,866, 2,933,480 and 3,093,621 which disclosures are incorporated herein by reference. Generally less than 20 mole percent of the nonconjugated diene is employed in conjunction with ethylene and propylene.

In accordance with the present invention, the heretofore mentioned copolymers or terpolymers are employed as starting materials in a controlled oxidation reaction using molecular oxygen; a gas such as air which contains molecular oxygen; or mixtures of oxygen with ozone. The reaction may be accomplished with or without the aid of substances which have been employed as free radical initiators. The temperature of the oxidation may very between about room temperature and about 200° F. Generally, the materials to be oxidized are placed in a suitable inert hydrocarbon solvent such as heptane, hexane, benzene, toluene and the like. In addition to these solvents, solvents which are not inert but which themselves can be oxidized such as cumene diisopropyl benzene or para-menthane are likewise usable. The temperature of the oxidation will generally be undertaken for a period ranging between about 15 minutes and about 10 hours, preferably between about 1 and about 5 hours. The products of the reaction obtained contain hydroperoxide groups (HOO) which are reactive groups capable of further reaction. The free radical initiators which may be employed are, for example, cumene hydroperoxide, dicumyl peroxide, benzoyl peroxide, azo-bis(isobutyronitrile), sodium persulfate, diethyl peroxydicarbonate, p-methane hydroperoxide, tertiary butyl peroxide, and the like. These free radical initiators have been conventionally employed in effecting hydroperoxidation of polymers and copolymers. It has been found that the more vigorous the oxidation conditions and the longer the length of time of maintaining such conditions, the larger the amount of hydroperoxide radicals introduced into the starting material. It is sufficient, however, if at least one hydroperoxide radical is introduced into each molecule of the starting material. It is especially desirable that a sufficient number of tertiary carbon atoms containing hydrogen atoms attached directly thereto are present in each molecule of the starting copolymer or terpolymer so that, upon subsequent treatment of the hydroperoxidized modified copolymer or terpolymer containing at least one vinylidene group and at least one carboxyl group or at least one polar group oxidizable into a carboxyl group, is formed in the final graft copolymer or graft terpolymer. By washing with solvent and water, the reacted mixture is freed of the free radical initiators and the hydroperoxide derivative is then subjected to a grafting operation.

The hydroperoxidized copolymer or terpolymer is reacted in the original solvent solution or a fresh solvent solution with at least an equimolar quantity of one or more monomeric compounds containing at least one vinylidene group or ethylenic unsaturation per molecule and at least one carboxyl group or a polar group which is convertible into a carboxyl group by oxidation or hydrolysis. Such polar groups are, for example, aldehyde, acid anhydride, nitrile, and the like. In general the most readily available monomeric compounds are utilized. The ethylenically unsaturated monocarboxylic acids such as acrylic acid, methacrylic acid, crotonic acid, erucic aid, and the like, are suitable monomeric compounds to employ. Similarly, the unsaturated dicarboxylic acids such as maleic acid, fumaric acid, maleic anhydride and fumaric anhydride are suitable acids to employ as the grafting monomer. Additionally, the ethylenically unsaturated acids such as oleic acid and linoleic acid, either in their monomeric or dimeric forms, may be employed as the grafting compound employed in conjunction with the hydroperoxidized copolymer or terpolymer.

Additionally, compounds such as acrylonitrile, methacrylonitrile, vinyl acetonitrile, methylacrylamide are utilizable as the monomeric grafting compound that can be utilized. Unsaturated aldehydes such as acrolein, crotonaldehyde, and the like may be oxidized to yield the corresponding carboxylic acid derivatives. These are also suitable as grafting monomers inasmuch as they contain at least one ethylenic linkage in the hydrocarbon radical portion of their molecules. It is further contemplated that the copolymers may be directly treated with carbon monoxide and hydrogen in the presence of, for example, cobalt carbonyl, to effect an oxo reaction since they will yield an aldehyde-alcohol derivative which, upon oxidation with oxygen or an oxidizing agent such as nitric acid with or without catalyst to obtain the carboxylic acid derivative. The nitriles and the anhydride derivatives are readily converted into carboxylic acid derivatives through the simple expedient of hydrolysis employing either an alkali metal base, an alkaline earth metal base, or a mineral acid, all according to conventional procedure heretofore well known. Suitable bases and acids include sodium hydroxide, potassium hydroxide, calcium hydroxide, barium hydroxide, sulfuric acid, nitric acid and the like. The reaction conditions involved in the conversion of these polar groups and to the corresponding carboxylate groups are well known and need not be detailed herein.

The heretofore mentioned hydroperoxide derivatives, prior to grafting, may also be further reacted with dibasic acids or their anhydrides, for example, succinic or maleic acids or anhydrides, or the hydroperoxide derivatives may be unsaturated with monocarboxylic acids such as acrylic, methacrylic, crotonic or erucic acids. Fumaric acid is also suitable for direct reaction. In fact, any mono or diethylenically unsaturated mono or dicarboxylic acid or their corresponding anhydrides may be employed as a reactant with the copolymer or terpolymer with hydroperoxide derivatives. Also, although less desirable, it is possible to subject the hydroperoxide derivatives to a reduction reaction using sodium sulfite, triethyl phosphite, lithium aluminum hydride, sodium borohydride, tertiary phosphines, hydrazine hydrate, aluminum amalgam, alkaline sodium sulfide, hydriodic acid, and zinc dust with acetic acid to effect a conversion of the hydroperoxide radicals into the corresponding hydroxyl and/or carboxyl groups. Usually these reduced products contain a predominance of hydroxyl groups but they also contain at least one and generally more carboxyl groups per molecule of reduced polymer as well. These carboxyl-containing reduced hydroperoxide copolymers or terpolymers may then be subjected, under controlled conditions, to the action of such compounds as maleic anhydride, succinic anhydride, fumaric acid, adipic acid, acrylic acid, or the dimer of linoleic acid under controlled esterification conditions so that the final product contains one or more free carboxyl groups either attached to the originally reduced hydroperoxidized copolymer or terpolymer or in the grafted monomer portion of the final polymeric derivative. In general, the monomer grafted onto the hydroperoxidized copolymers or terpolymers or grafted onto the reduced hydroperoxidized copolymers or terpolymers is one which is capable of copolymerization and homopolymerization in the presence of free radical type catalysts such as the conventionally employed organic peroxides. These grafting monomers may contain one or more ethylenic unsaturations per molecule and additionally containing polar groups attached thereto which are either carboxyl groups or groups such as nitrile, aldehyde, keto and the like and which are capable of being oxidized to carboxyl groups. Once the grafting operation has been completed if the nitrile group is, for example, attached to the grafting monomer, then the grafted compound is subjected to further hydrolysis treatment in order to convert the nitrile group to the corresponding carboxy group or if the grafted copolymer or terpolymer derivative contains an aldehyde group as a polar grouping, the final product is subjected to an oxidation treatment, either catalytic or otherwise, in order to convert the aldehyde group to a carboxyl group.

The corresponding carboxyl containing grafted copolymers or grafted teroplymers either in their original solution or after isolation and redissolving in suitable hydrocarbon solvents of the type heretofore mentioned are contacted with approximately equimolar amounts of a polyalkylene polyamine to convert the carboxyl derivatives into the amine acid addition salts or into amides or mixtures of both. The polyalkylene polyamine employed for this purpose is preferably a polyethylene polyamine or a trimethylene polyamine. Suitable polyethylene polyamines have the general formula,

RNH(CHXCHXNH)m(CHXCHX)nNHR where R contains not more than eight carbon atoms and is of the group consisting of hydrogen, alkyl, cycloalkyl, aromatic, olefinic, and cycloolefinic radicals, each X contains not more than three carbon atoms and is of the group consisting of hydrogen and aliphatic radicals, $m$ is an integer between 0 and 8, inclusive, and $n$ is an integer of the group consisting of 0 and 1 and is 1 when $m$ is greater than 0. Each of the foregoing radicals (other hydrogen) can be completely hydrocarbon in character, and R can be of mixed character when containing six or more carbon atoms, such as alkylcycloalkyl, aralkyl, alkaryl groups, and the like, and both R and X can also have non-hydrocarbon substituents; particularly useful non-hydrocarbon constituents include oxygen in the form of hydroxy and ether compounds, sulfur in similar compounds, (i.e., mercapto compounds and thioethers), and halogen compounds. Examples of such polyethylene polyamines include ethylenediamine, hydrazine, diethylenetriamine, tetraethylenepentamine, di(methylethylene) triamine, N-(2-hydroxyethyl)-1,2-ethanediamine, n-phenylethylenediamine, N-cyclohexyl-N'-(2-amino ethyl)-1,2-ethanediamine, carbamates of the foregoing, and the like.

No special reaction conditions are necessary in order to achieve the formation of the ammonium type salts, i.e., the amine acid addition salts, a mere neutralization being sufficient. In the case of the formation of amides, the refluxing of from 1 to 5 hours at reflux temperatures up to 100° C. are sometimes employed but in general only mild reaction conditions need be undertaken in order to secure the condensation of the carboxyl groups of the graft polymers with the amino groups of the polyalkylene polyamines. The present invention contemplates the use of the amine acid addition salts of the above defined graft copolymers, the addition of the amides of the above defined graft copolymers and the addition of the mixtures of the amine acid addition salts and the amides of the above defined graft polymers to the oils selected from the group consisting of gasoline, middle distillate fuel and lubricating oil.

The amount of additives employed is not critical but in general there is employed no less than 0.002 wt. percent or no more than 10.0 wt. percent. The use of lesser amounts will generally result in no measurable beneficial effect as to dispersancy of sludge and the addition of more than this amount as specified is simply a waste of the additive for it does not give any improved results over the use of lesser amounts. Preferably the novel dispersants are added in an amount ranging between about 0.1 and about 5.0 wt. percent based upon the total composition of the oil.

Other well known and conventional additives which have been employed as sludge dispersants in the case of mineral lubricating oils as viscosity index improvers and which are well known for this purpose may be used in conjunction and in association with the herein defined novel dispersants and/or viscosity index improvers. Furthermore, the usual types of antioxidants, pour point depressants which are customarily employed to improve filterability of fuels, particularly the middle distillate fuels, and which have been employed advantageously in association with mineral lubricating oils may likewise be added in association and in conjunction with the novel and hereindefined nitrogen-containing graft copolymers.

In order to illustrate the more precise nature and character of the invention but without any intention to be limited thereto, the following examples are set forth as illustrative:

Example 1

An ethylene-propylene copolymer having an inherent viscosity of about 2.5 in Decalin at 135° C. and containing about 50 wt. percent ethylene was prepared in hexane solvent by polymerizing ethylene and propylene using a Ziegler catalyst of vanadium oxytrichloride and complexed with diethyl aluminum chloride. 50 grams of this copolymer were dissolved in 2 liters of normal heptane and oxidized by passing 200 milliliters of oxygen gas containing 10 milligrams of ozone per liter of oxygen through the solution. The pressure was maintained at about 1 atmosphere and the temperature at about 70° C. After 5½ hours of oxidation, the polymer solution was contacted with 8.8 cc. of acrylonitrile after the reaction vessel was first pressurized with nitrogen and the temperature was allowed to reach 50° C. The catalyst employed was 188.1 milligrams of ferric iron acetylacetonate and 82.5 milligrams of benzoin. The reaction mixture was stirred for a period of 3 hours while the reaction zone and its contents were maintained at a temperature of about 50° C. The grafted polymer was precipitated by adding several liters of acetone to the reaction mixture. It was washed and drum dried yielding a soft elastomer containing about 0.6 wt. percent of nitrogen.

Example 2

About 150 grams of the acrylonitrile grafted copolymer was dissolved in 1,000 grams of heptane and refluxed with 30 grams of potassium hydroxide dissolved in 100 cc. of water; the refluxing taking place for a period of three hours. The aqueous layer was separated from the organic layer and the organic phase was washed with 200 cc. of 10% aqueous hydrochloric acid and finally washed with water until neutral. The solvent was then evaporated off and 140 grams of the hydrolyzed acrylonitrile graft copolymer was obtained.

Example 3

120 grams of the product of Example 2 was mixed with 100 grams of solvent extracted neutral paraffinic oil having a viscosity index of about 103 and a viscosity of about 150 SUS at 100° F., 8 grams of tetraethylene pentamine and 500 cc. of heptane were then added and the mixture was refluxed for 6 hours, filtered, and the solvent evaporated off.

Example 4

A Cyclic Temperature Sludge Test was carried out to determine the sludge dispersant properties of the product of Example 3. This standardized sludge test may be described as follows: The Cyclic Temperature Sludge Test is designed and is to subject test oils to conditions which have been shown to give sludge deposits similar to those obtained in stop-and-go driving such as would be experienced in taxicab operation. Briefly described, in this test a Ford 6-cylinder engine is run on a dynamometer stand through alternate cycles, the first cycle lasting five hours, at 1500 r.p.m., and the second cycle lasting two hours, at the same operating speed, with the oil sump and water jacket temperatures being slightly higher in the second cycle than in the first. The two cycles are alternated in sequence until the desired total test time has elapsed. Make-up oil is added as required so as to maintain the oil level in the crankcase at all times between about 3½ and 4 quarts. At the end of selected periods of test time, the engine is inspected by disassembling it sufficiently to permit visual examination of several of the parts, including the rocker arm assembly, the rocker arm cover, the cylinder head, the push rod chamber and its cover, the crankshaft and the oil pan. These parts are visually and quantitatively rated for sludge deposits, using a CRC sludge merit rating system in which a numerical rating of 10 represents a perfectly clean part, and the numerical scale decreases to a minimum value representing a part covered with the maximum amount of sludge possible. The several merit ratings are averaged to give an overall engine merit rating.

The oil employed in this Cyclic Temperature Sludge Test was a neutral solvent extracted Mid-Continent oil having a flash point of 450° F., an API gravity of 29.0, a pour point of +15° F., a viscosity index of 100, and a viscosity of 325–340 SUS at 100° F. and 50 SUS at 210° F. In making up the test base oil there was added 0.9% of the heretofore mentioned zinc salt of the specific dialkyl diphosphoric acid above defined. There was also added to the base oil 3.5 wt. percent of a colloidal dispersion of barium carbonate and barium nonyl phentate stabilized by a phosphosulfurized polyisobutene as a dispersant. The composition was prepared by admixing nonyl phenol with barium hydroxide and phosphosulfurized polyisobutylene so as to produce the barium nonyl phenate and the mix was finally blown with carbon dioxide so that the excess unreacted barium was converted into barium carbonate. This is a well known and conventionally employed antioxidant and detergent for lubricating oils.

This test base oil, under comparative conditions, was then subjected to the Cyclic Temperature Sludge Test; one portion of the oil containing 1% by weight of polyisobutenylsuccinic anhydride neutralized with triethylene tetramine as disclosed in U.S. Patent No. 3,172,892 and the other aliquot containing 1% by wt. of the product of Example 3. The sludge merit ratings were as follows:

CYCLIC TEMPERATURE SLUDGE TEST

| Hours | Sludge Merit Ratings | | | | | |
|---|---|---|---|---|---|---|
| | 56 | 63 | 77 | 84 | 98 | 105 |
| 1% Product of Patent 3,172,892 | 9.5 | | 9.1 | | 7.4 | |
| 1% Product of Example 3 | | 9.89 | | 9.1 | | 8.15 |

A comparison of the conventional and heretofore considered excellent sludge dispersant of U.S. Patent 3,172,892 showed a lower merit rating of sludge dispersancy than did the same amount of the material of Example 3.

*Example 5*

The hydroperoxidized ethylene-propylene copolymer solution of Example 1 was contacted with an aqueous solution of sodium sulfide for 1 hour. This polymer solution was washed with distilled water three times. The polymer was recovered by steam distillation in normal heptane followed by vacuum drying at 40° C. for 20 hours. The reduced, i.e., hydroxylated ethylene-propylene copolymer contained 9.2 millimoles of hydroxyl (OH) per 100 grams of product and had a viscosity average molecular weight of about 30,000.

150 grams of this hydroxylated derivative were refluxed with 3 grams of maleic anhydride along with 200 cc. of heptane. At the end of 6 hours the maleic anhydride had gone into solution and reacted with the hydroxylated copolymer after which 4 grams of tetraethylene pentamine were added. Refluxing was continued for an additional 12 hours. A total of 0.4 cc. of water was collected. The solution was filtered and stripped of solvent after which the product was dried in a vacuum at 80° C. for 6 hours. 140 grams of the product were recovered.

*Example 6*

A base oil having the following inspections:

| | |
|---|---|
| Flash point, ° F. | 450 |
| API gravity | 29.0 |
| Pour point, °F. | +15 |
| Viscosity index | 100 |
| Viscosity SUS at 100° F. | 325–340 |
| Viscosity SUS at 210° F. | 50 | was employed. This base oil was subjected to a Cyclic Temperature Sludge Test in which the product described in Example 4, i.e., the product of U.S. Patent 3,172,892, was used in an amount of 1 wt. percent in one aliquot and in the second aliquot a like amount of the product of Example 5 was used. The following sludge merit ratings were obtained:

quately for more than 21 hours longer than does the product of U.S. Patent 3,172,892.

*Example 7*

Into a three-necked, 2 liter flask fitted with a thermometer, stirrer, reflux condenser, gas inlet and outlet tubes, and an opening to permit the introduction of liquid reagents, was charged at room temperature 50 grams of rubbery ethylene/propylene/5-methylene - 2 - norbornene terpolymer in 1 liter of normal heptane. The terpolymer introduced into the reaction zone consisted of 54 wt. percent ethylene, 42.6 wt. percent propylene and 3.4 wt. percent 5-methylene-2-norbornene. The reaction flask and its contents were brought to a temperature of 80° C. with stirring. Nine millimoles of azo-bis(butyronitrile) was added and then oxygen was introduced through the gas inlet tube below the surface of the normal heptane-terpolymer solution at a rate of 100 cc. per minute. The flow of gaseous hydroperoxidation reagents was maintained for a period of 6 hours. At the end of the aforementioned time the oxygen was shut off and gaseous nitrogen was passed through the reaction mixture for 1 hour to remove any unreacted oxygen from the solution. Following the completion of the nitrogen purge, the reactant solution was tested and was found to contain a hydroperoxide concentration of 21.6 millimoles per liter. This was determined by reacting the hydroperoxides with an excess of potassium iodide to yield free iodine. The iodine is then titrated with a standard solution of potassium thiosulfate using a starch indicator.

Following the hydroperoxidation reaction, the reaction vessel was pressurized with nitrogen, the temperature was reduced to 50° C., and the grafting reagents introduced into the reaction zone. The grafting reagents consisted of 90 mls. of acrylonitrile, 20 mgs. of iron (III) acetylacetonate, and 200 mgs. of benzoin. The reaction mixture was stirred for a period of 3 hours while the reaction zone and its contents were maintained at a temperature of about 50° C. The reaction was terminated by adding 0.2 gm. of hydroquinone, and the grafted polymer precipitated by adding several liters of acetone to the reaction mixture. The precipitated grafted terpolymer was then washed and drum dried giving 63.2 grams of a soft elastomer containing about 26.4 wt. percent grafted acrylonitrile.

Infrared spectra of a film of the elastomer indicated adsorption at wave lengths that may be recognized as coming from the grafted acrylonitrile. Further, all of the infrared adsorption characteristics of ethylene/propylene/5-methylene-2-norbornene terpolymer was found illustrating that the double bonds present were not destroyed by the hydroperoxidation or grafting of the polymers. Iodine numbers were also determined for the graft polymer and showed that the relatively small amount ($3.2 \times 10^{-2}$ mole percent) of unsaturation present in the original backbone polymer was essentially retained in the grafted terpolymer.

Further tests were conducted to determine whether a true graft terpolymer was formed rather than a mixture of terpolymer and homopolymerized acrylonitrile. The tests were affected by extracting the acrylonitrile grafted terpolymer with dimethylformamide which is known to be a solvent for polyacrylonitrile. Only a small portion

CYCLIC TEMPERATURE SLUDGE TEST

| Hours | 56 | 63 | 77 | 84 | 98 | 108 | 126 | 147 |
|---|---|---|---|---|---|---|---|---|
| 1 wt. percent product of Example 5 | | 9.86 | | 9.75 | | 9.5 | 8.5 | 6.4 |
| 1 wt. percent product of 3,172,892 | 9.6 | | 9.1 | | 7.4 | | 5.4 | |

From this data it is apparent that the product of Example 5 is an excellent dispersant which performs adequately of the polymer corresponding to less than 0.5% by weight of the total polymer was found to be soluble. Nitrogen analysis of the dimethylformamide soluble material indicated that it is highly grafted terpolymer rather than polyacrylonitrile. The insolubility of the bulk of the grafted terpolymer illustrates that the acrylonitrile chains are chemically bonded to the starting polymer and is thus a true graft polymer and not a mixture of the acrylonitrile homopolymer and ethylene/propylene/5-methylene-2-norbornene terpolymer.

*Example 8*

The procedure of Example 7 is repeated except that iron octoate was used in the grafting step in place of the iron acetylacetonate of said example. After the reaction was terminated and the polymer recovered it was found to contain 25.1 wt. percent grafted acrylonitrile. No homopolymer was found by dimethylformamide extraction of the grafted polymer.

*Example 9*

About 100 grams of the acrylonitrile grafted copolymer prepared in Example 7 was dissolved in 1000 grams of heptane and refluxed with 20 grams of potassium hydroxide dissolved in 80 cc. of water for a period of 3 hours. The organic phase was then washed with 200 ml. of water, 10% HCl solution and water successively. After removing the solvent, about 85 grams of hydrolyzed product was obtained. About 80 grams of the acid was heated with 2 grams of tetraethylenepentamine for 5 hours. 81 grams of product was obtained.

Having now thus fully described and illustrated the nature of the invention, what is desired to be secured by Letters Patent is—

1. An oleaginous composition comprising an oil selected from the group consisting of gasoline, middle distillate fuel and lubricating oil and between about 0.002 and about 10 wt. percent of an oil-soluble nitrogen containing graft polymer prepared by hydroperoxidizing a polymer comprised of ethylene and at least one other alpha-olefin, said polymer containing from about 20% to about 75% by weight of ethylene and from about 25% to about 80% by weight of alpha-olefin, grafting onto said hydroperoxidized polymer an ethylenically unsaturated carboxylic acid and reacting said graft polymer with a polyalkylene polyamine.

2. A composition as in claim 1 wherein the oil is a lubricating oil.

3. A composition as in claim 1 wherein said alpha-olefin is propylene.

4. A composition as in claim 1 wherein the polyalkylene polyamine is tetraethylenepentamine.

5. A composition as in claim 1 wherein the oil is a lubricating oil and the nitrogen containing graft polymer is present in an amount between about 0.5 and about 2.0 wt. percent.

6. An oleaginous composition comprising an oil selected from the group consisting of gasoline, middle distillate fuel and lubricating oil and between about 0.002 and about 10 wt. percent of an oil soluble nitrogen containing graft polymer prepared by hydroperoxidizing a polymer comprised of 20–75 wt. percent ethylene and 25–80 wt. percent of at least one other alpha olefinic monomer and having a viscosity average molecular weight between 100,000 and 500,000, grafting to said hydroperoxide an alkenyl nitrile, hydrolyzing said grafted polymer to convert said nitrile to carboxyl and reacting said carboxyl derivative with a polyalkylene polyamine to produce a nitrogen containing reaction product.

7. A composition as in claim 6 wherein the oil is a lubricating oil.

8. A composition as in claim 6 wherein said alpha-olefinic monomer is propylene.

9. A composition as in claim 6 wherein the grafting polar monomer is acrylonitrile.

10. A composition as in claim 6 wherein the polyalkylene polyamine is tetraethylenepentamine.

11. An oleaginous composition comprising a mineral oil selected from the group consisting of gasoline, middle distillate fuel, and lubricating oil and between about 0.1 and about 5.0 wt. percent of an oil-soluble nitrogen containing graft copolymer prepared by hydroperoxidizing an ethylene-propylene copolymer containing from about 20% to about 75% by weight of ethylene and from about 25% to about 80% by weight of propylene and having a viscosity average molecular weight of above 100,000, grafting acrylonitrile to said copolymer, hydrolyzing said grafted copolymer with a compound selected from the group consisting of an alkali metal base, an alkaline earth metal base, and a mineral acid and reacting the resultant carboxyl containing graft copolymer with tetraethylenepentamine.

12. A composition as in claim 11 wherein the hydrolyzing compound is caustic potash.

13. A composition as in claim 11 wherein the mineral oil is a lubricating oil, the hydrolyzing compound is an alkali metal base and the nitrogen containing graft copolymer has a viscosity average molecular weight of less than 100,000.

14. An oleaginous composition comprising an oil selected from the group consisting of gasoline, middle distillate fuel and lubricating oil and between about 0.002 and about 10 weight percent of an oil-soluble nitrogen containing graft polymer prepared by hydroperoxidizing a polymer comprised of 20–75 weight percent ethylene and 25–80 weight percent of at least one other alpha-olefin, grafting onto said hydroperoxidized polymer an ethylenically unsaturated polar monomer selected from the group consisting of alkenyl aldehydes, acid anhydrides and mixtures thereof, converting said graft polymer to the corresponding carboxyl derivative and reacting said carboxyl derivative with a polyalkylene polyamine.

References Cited

UNITED STATES PATENTS

| | | |
|---|---|---|
| 2,837,496 | 6/1958 | Vandenberg. |
| 3,088,931 | 5/1963 | Scanley et al. _____ 252—51.5 X |
| 3,130,161 | 4/1964 | Vander Voort _____ 252—51.5 |
| 3,219,666 | 11/1965 | Norman et al. _____ 252—51.5 X |
| 3,235,503 | 2/1966 | de Vries _____ 44—62 X |

FOREIGN PATENTS 983,040  2/1965  Great Britain.

DANIEL E. WYMAN, *Primary Examiner.*

P. P. GARVIN, *Assistant Examiner.*